No. 715,889. Patented Dec. 16, 1902.
S. SMITH.
MEANS FOR PROPELLING CYCLES OR OTHER LIGHT VEHICLES.
(Application filed Sept. 5, 1902.)
(No Model.) 3 Sheets—Sheet 1.
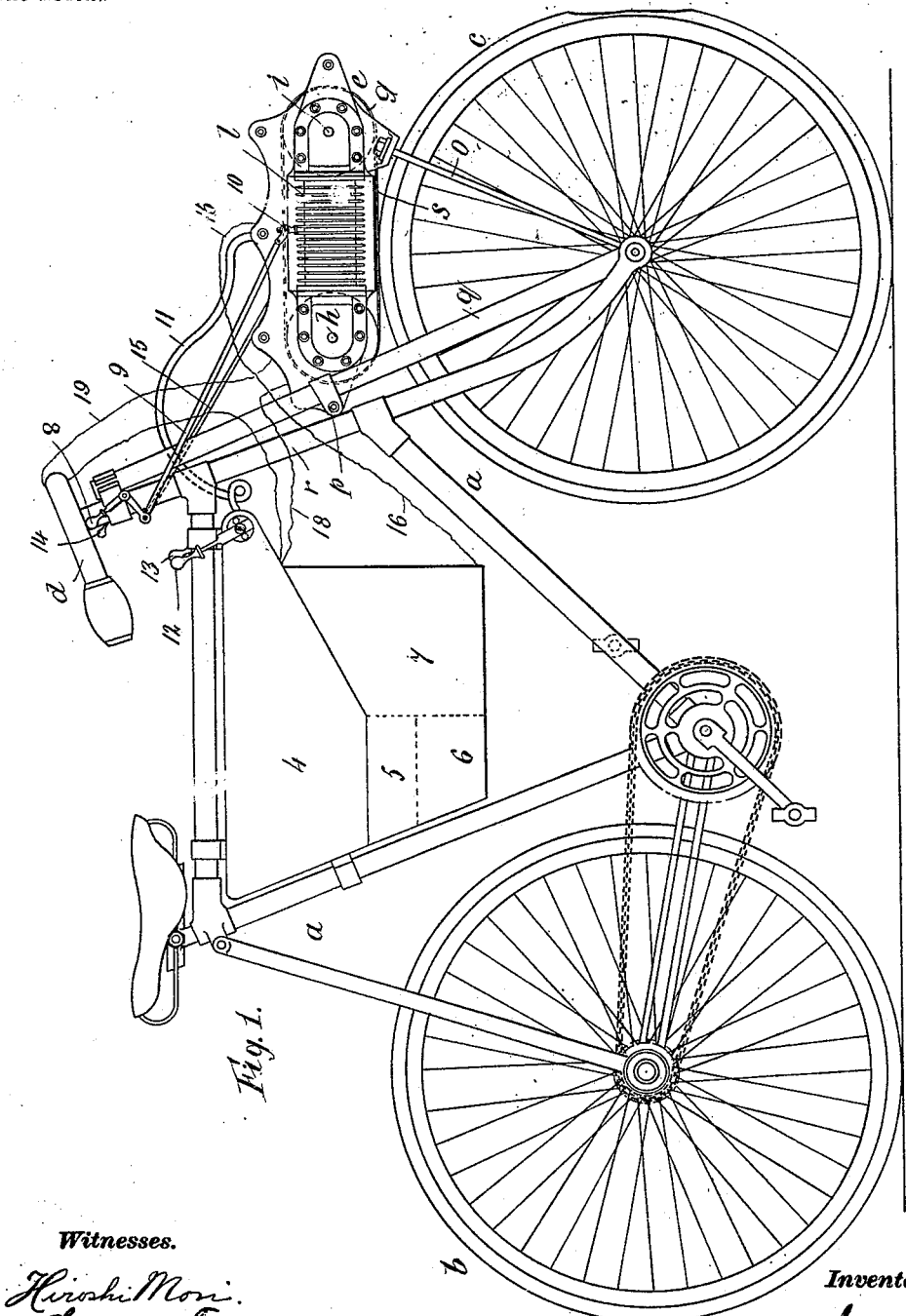
Witnesses.
Hiroshi Mori.
Ludwig Flum.
Inventor.
Sydney Smith
H. B. Singer,
Att'y.

No. 715,889. Patented Dec. 16, 1902.
S. SMITH.
MEANS FOR PROPELLING CYCLES OR OTHER LIGHT VEHICLES.
(Application filed Sept. 5, 1902.)
(No Model.) 3 Sheets—Sheet 3.
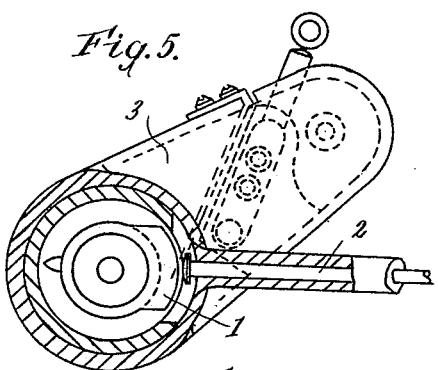
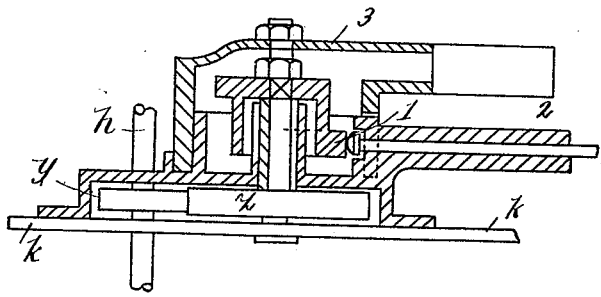
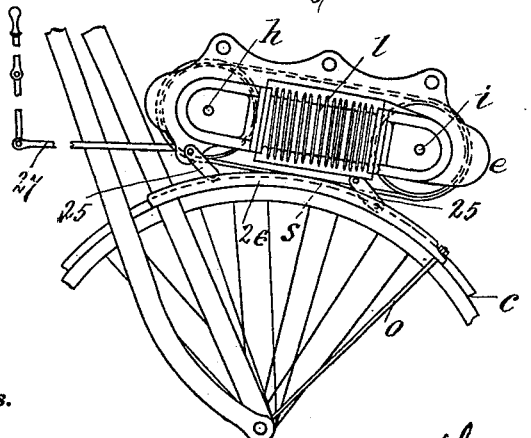
Witnesses.
Hiroshi Mori
Ludwig Flam
Inventor.
Sydney Smith
by B. Singer
Att'y.

No. 715,889. Patented Dec. 16, 1902.
S. SMITH.
MEANS FOR PROPELLING CYCLES OR OTHER LIGHT VEHICLES.
(Application filed Sept. 5, 1902.)

(No Model.) 3 Sheets—Sheet 2.

Witnesses.
Hiroshi Mori
Ludwig Flam

Inventor.
Sydney Smith
by H. Singer
Att'y.

UNITED STATES PATENT OFFICE.

SYDNEY SMITH, OF MILTON-OF-CAMPSIE, SCOTLAND.

MEANS FOR PROPELLING CYCLES OR OTHER LIGHT VEHICLES.

SPECIFICATION forming part of Letters Patent No. 715,889, dated December 16, 1902.

Application filed September 5, 1902. Serial No. 122,247. (No model.)

*To all whom it may concern:*

Be it known that I, SYDNEY SMITH, engineer, a subject of the King of Great Britain, and a resident of Broomknowe Cot, Milton-of-Campsie, Stirlingshire, Scotland, have invented certain new and useful Improved Means for Propelling Cycles or other Light Vehicles, of which the following is a specification.

This invention relates to an improved method of and means for propelling cycles and other light vehicles.

At present it is usual to propel a cycle—such as a motor-bicycle, for instance—by means of a driving belt or chain running on pulleys on the motor and the bicycle. It has also been proposed in some cases to drive bicycles by means of a motor geared with a friction-wheel, which in turn drives the periphery of the bicycle-wheel. Under my invention the cycle is driven by a motor whose driving-wheels are so arranged as to act directly on the periphery of the cycle-wheel at two (or more) points or over a lengthened arc, so as to give a certain drive without destroying or injuring the tire. This direct-driving arrangement eliminates several unnecessary parts used in other gears, with the result that the apparatus can be much simplified and friction and weight reduced, while the frame of the cycle is not subjected to a great weight or strain. Further, the motor is so constructed and arranged that vibration is considerably reduced, while the method of attachment is so simple that the motor can be readily fitted to and detached from the bicycle. In the case of cycles with rubber or pneumatic tires any vibration there may be is either wholly or to a great extent absorbed or neutralized by the tire on which the motor rests.

The invention can be carried out in different ways to suit different vehicles; but in order that the invention may be clearly understood I have, by way of example, shown on the drawings annexed a convenient method of driving a bicycle.

Figure 2:
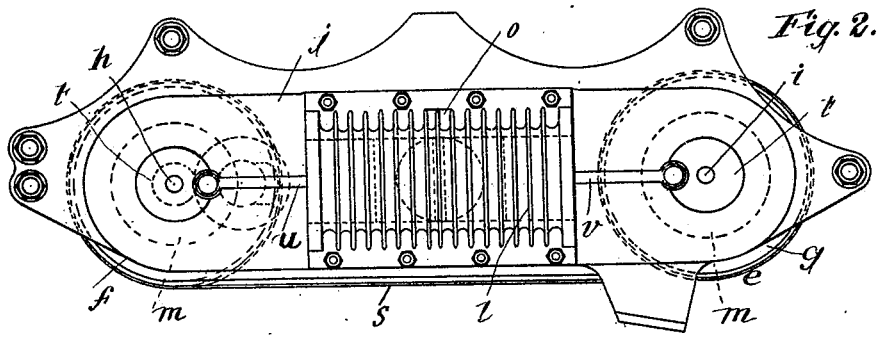
Figure 3:
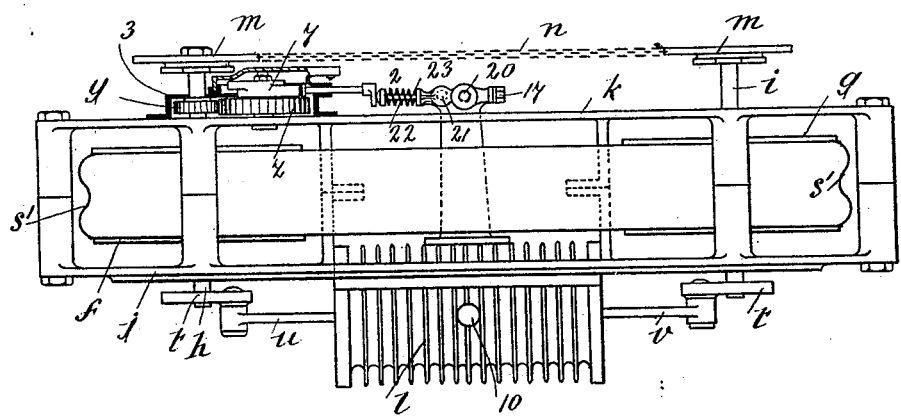
Figure 4:
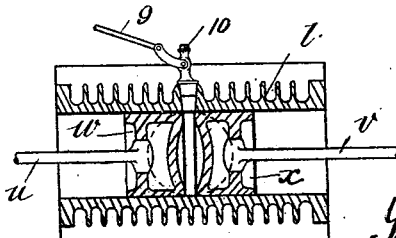

On the drawings, Figure 1 is a side elevation of an ordinary form of bicycle with the motor applied thereto. Fig. 2 is a side elevation of the motor, which is drawn to an enlarged scale. Fig. 3 is a plan of the motor. Fig. 4 is a section through the cylinder of the motor. Figs. 5 and 6 show in side view and section an enlarged detail of the motor. Fig. 7 shows a slight modification.

The same reference letters and numerals wherever repeated indicate the same parts.

$a$ is the bicycle-frame; $b$, the back wheel; $c$, the front wheel; $d$, the handle-bar, and $e$ the motor for driving the cycle.

The motor-engine may be of any suitable design and construction; but I prefer to use an engine whose parts are constructed and act in the same or a similar manner to the engine of the well-known Minerva motor. The Minerva engine is a petrol-engine, with spirit-reservoir, carbureter, electric ignition, and the other well-known accessories to such engines. Under my invention I make the motor with two driving-wheels $f\,g$, keyed to shafts $h\,i$, carried in bearings in two side frames $j\,k$, which are bolted together, as shown at Figs. 2 and 3. The cylinder $l$ of the engine is secured to the frame $j$. On the shafts $h\,i$ are sprocket-wheels $m\,m$, geared together by a chain $n$. The peripheries of the wheels $f\,g$ may be arranged to rest upon and drive the periphery of the cycle-wheel $c$. The motor is supported in position above the wheel $c$ by means of stays $o$ and clamps $p$, which latter are fastened to a strong fork $q$, fitted in front of the ordinary steering-fork $r$ of the bicycle. It will be seen that the supporting connections are such that the motor can be readily detached when necessary. Instead of the motor-wheels being arranged to bear on the cycle-wheel I preferably use an endless belt or band $s$, which is arranged to run around the wheels of the motor and bear upon the periphery of the cycle-wheel, as shown at Figs. 1 to 3. The belt is preferably made thicker at each side and slightly concave in the center, as shown at $s'$, Fig. 3, to enable it to grip better. This method of driving obviates the possibility of the rapid-revolving motor-wheels grooving the tire of the bicycle-wheel, which would be the case if the motor wheels were arranged to bear directly on the cycle-wheel. For the purpose of reducing vibration I provide the shaft of each wheel $f\,g$ with a driving-disk $t$ or a crank, and each disk is connected with a piston-rod. The two piston-rods $u\,v$ are connected to trunk-pistons $w\,x$, which work in the same cylinder $l$ and are arranged back to back, (see Fig. 4,) and the shafts h i are connected by the chain n in such a manner that the pistons reciprocate back and forward simultaneously and in opposite directions. Each moving mass is made of exactly the same weight as the other and arranged to move in the same plane. The center of gravity remains constant, so that vibration is reduced to a minimum. The motor-wheels are when arranged to drive directly on the bicycle-wheel c provided with pneumatic or other rubber tires.

y is a pinion on the shaft h, which drives the wheel z and cam 1 for operating the gear 2 for controlling the gas admission and the ignition apparatus, which parts are shown to an enlarged scale at Figs. 5 and 6. They are the same as in the Minerva motor, before referred to.

3, Figs. 3, 5, and 6, is a dust-proof casing or cover for the parts.

4 is the carbureter and spirit-reservoir; 5, the oil-reservoir; 6, the accumulator-chamber, and 7 the coil-chamber.

8 is the handle, and 9 the lever, for operating the gas-compression tap 10.

11 is the induction-pipe, by means of which gas and air are admitted to the cylinder of the motor.

12 is the handle for controlling the air-supply, and 13 the handle for controlling the gas-supply.

14 is the advance spark-handle attached to the lever 15, by means of which the acceleration of speed of the motor is changed, causing the ignition to take place earlier or later, as desired.

16 is the wire connection from the coil to the sparking plug 17.

18 is the wire connection from the coil to the commutator.

19 is the switch-wire connected to handle-bar d.

20 is the gas-inlet; 21, the exhaust-opening; 22, the exhaust-valve spindle; 23, a spring on exhaust-valve spindle.

The above parts are all practically the same as those in use in such well-known petrol-engines as the Minerva motor, &c.

The motor is covered in as far as possible, so as to exclude dust, and it is provided with the necessary combustible fluid from the reservoir on the cycle.

I have described the motor as having two driving-wheels; but I may make either of the wheels a driving-wheel and the remaining one a free wheel.

The motor may be constructed and fitted differently, according to the nature of the vehicle to be driven; but in every case it is so arranged as to give a direct drive to the periphery of the wheel of the vehicle.

The motor can be allowed to bear upon the cycle-wheel by its own weight or by the action of springs connected with the axle of the bicycle-wheel or to the frame or in other suitable manner, so that when the motor is set in action there will be sufficient frictional contact between the motor-wheels and the bicycle-wheel to set the latter in motion.

Fig. 7 shows an arrangement in which the motor is secured by links 25 to a cradle 26, which latter is rigidly supported on the bicycle. By manipulating a lever 27, connected with the links, the motor can be lowered, so that its band s will bear on the tire of the wheel c, or be raised up, so as to allow the wheel to run free.

I have referred to a motor driven by combustible fluid, but the motor may be driven by compressed air or other power.

If desired, variable gearing may be provided, so that the motor may be driven at different speeds.

Having now fully described my invention, what I claim, and desire to secure by Letters Patent, is—

1. The combination with a cycle or other light vehicle of a motor, wheels driven by the motor and an endless band actuated by the wheels and arranged in contact with the periphery of one of the wheels of the cycle or other vehicle so as to drive the same.

2. The combination with a cycle or other light vehicle of a petrol or like motor having side frames with two driving-wheels thereon and a cylinder with two pistons arranged back to back and adapted to move simultaneously and in opposite directions, gearing for connecting the driving-wheels, and an endless belt or band passed over the driving-wheels and bearing on and driving the cycle or vehicle-wheel, substantially as described.

3. The combination with the cycle, of a strong fork fitted in front of the steering-fork of the cycle, a motor secured to the said strong fork at a point above the front wheel of the cycle, wheels driven by the motor, and an endless band actuated by the said wheels, said band contacting with the periphery of the front wheel of the cycle, substantially as and for the purpose specified.

Signed at London, county of Middlesex, England, this 20th day of August, 1902.

SYDNEY SMITH.

Witnesses:
HERBERT SELLEY,
ROBERT SELTH.